United States Patent
Bajpai (10) Patent No.: US 12,418,521 B2
(45) Date of Patent: Sep. 16, 2025

(54) SYSTEMS AND METHODS FOR DISTRIBUTED AGENT-BASED MONITORING OF CRYPTOGRAPHIC KEY STORES

(71) Applicant: BANK OF AMERICA CORPORATION, Charlotte, NC (US)

(72) Inventor: Ashutosh Bajpai, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 200 days.

(21) Appl. No.: 18/243,992

(22) Filed: Sep. 8, 2023

(65) Prior Publication Data
US 2025/0088497 A1 Mar. 13, 2025

(51) Int. Cl.
*H04L 9/40* (2022.01)
*H04L 9/08* (2006.01)

(52) U.S. Cl.
CPC ........ *H04L 63/0823* (2013.01); *H04L 9/0877* (2013.01)

(58) Field of Classification Search
CPC ................ H04L 63/0823; H04L 19/0877
See application file for complete search history.

(56) References Cited

U.S. PATENT DOCUMENTS

| | | | |
|---|---|---|---|
| 6,934,393 B2 | 8/2005 | Aull | |
| 7,493,486 B1 | 2/2009 | Jacobs | |
| 7,647,494 B2 | 1/2010 | Wray | |
| 8,767,965 B2 | 7/2014 | Di Crescenzo | |
| 9,614,833 B1 * | 4/2017 | Rao | H04L 63/0823 |
| 9,954,848 B1 * | 4/2018 | Stoica | H04L 9/0894 |
| 10,326,754 B2 | 6/2019 | Newton | |
| 10,380,362 B2 | 8/2019 | Nix | |
| 10,547,457 B1 * | 1/2020 | Duccini | H04L 9/14 |
| 10,764,313 B1 * | 9/2020 | Mushtaq | G06N 20/00 |
| 11,477,011 B1 * | 10/2022 | Pelton | H04L 9/3263 |
| 11,930,123 B2 * | 3/2024 | Simplicio, Jr. | H04L 63/0823 |
| 2002/0178354 A1 | 11/2002 | Ogg | |
| 2004/0111607 A1 | 6/2004 | Yellepeddy | |
| 2005/0114367 A1 | 5/2005 | Serebrennikov | |
| 2007/0214357 A1 | 9/2007 | Baldus | |

(Continued)

*Primary Examiner* — Viral S Lakhia
(74) *Attorney, Agent, or Firm* — Moore & Van Allen PLLC; Nicholas C. Russell (57) ABSTRACT

Systems, computer program products, and methods are described herein for agent-based monitoring of cryptographic key stores. The present disclosure is configured for receiving a digital certificate request from a requesting entity, interfacing with a certificate manager service configured to store a database for tracking lifecycle of digital certificates, generating and disseminating a notification of a certificate event to designated recipients via real-time communication mechanisms, utilizing a specialized engine as an agent to capture and analyze events related to certificate requests and generate alerts via a specified communication medium, integrating the specialized engine and enterprise infrastructure units via a series of remote procedure calls and secure file transfers, transmitting serialized data packets to an incident response management (IRM) system, noting security parameters and interpreting incoming data for potential anomalies; and sending a process requests to an end user interface.

17 Claims, 4 Drawing Sheets

(56) References Cited

U.S. PATENT DOCUMENTS

| | | |
|---|---|---|
| 2011/0167258 A1 | 7/2011 | Schibuk |
| 2011/0197061 A1 | 8/2011 | Chou |
| 2012/0331288 A1 | 12/2012 | Kapoor |
| 2013/0339743 A1 | 12/2013 | Hada |
| 2014/0325231 A1 | 10/2014 | Hook |
| 2014/0351581 A1 | 11/2014 | Pritikin |
| 2020/0028842 A1* | 1/2020 | Leiserson ............. H04L 9/3268 |
| 2020/0044869 A1 | 2/2020 | Lutz |
| 2020/0235939 A1* | 7/2020 | Obaidi ...................... H04L 9/14 |
| 2021/0006417 A1 | 1/2021 | Pala |
| 2021/0029151 A1* | 1/2021 | Brooks ................ H04L 9/3218 |
| 2021/0209593 A1 | 7/2021 | Trujillo |
| 2021/0306156 A1 | 9/2021 | Madineni |
| 2024/0291865 A1* | 8/2024 | Mikolajczyk ....... H04L 63/1416 |
| 2024/0380745 A1* | 11/2024 | Patil ...................... H04L 9/0894 |
| 2024/0414144 A1* | 12/2024 | Chirala .............. H04L 63/0807 |

\* cited by examiner

SYSTEMS AND METHODS FOR DISTRIBUTED AGENT-BASED MONITORING OF CRYPTOGRAPHIC KEY STORES

TECHNOLOGICAL FIELD

Example embodiments of the present disclosure relate to agent-based monitoring of cryptographic key stores.

BACKGROUND

There is a basic requirement for typical enterprise and third-party applications to interact or communicate with end users and consumer platforms/systems. To ensure data integrity and authenticity these end point application platforms reply on secure communication channel using digital certificates and public key infrastructure (PKI). Unfortunately, digital certificates and keys that enable secure communication channels are often accompanied by defined expiration beyond which they need to be renewed. Currently, most of the effort to monitor and renew these digital certificates is manual in nature and is prone to human error which leads to application outage and in some cases leaving the open door for malicious actor to penetrate various systems or security measures. Furthermore, the trust stores and keystores may have stale or unused public/private key pairs that are not monitored and provide an easy door access to malicious actors.

As such, Applicant has identified a number of deficiencies and problems associated with agent-based monitoring of cryptographic key stores. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for agent-based monitoring of cryptographic key stores.

While many enterprises use PKI solutions to manage their cryptographic key and digital certificate lifecycles, these systems often lack continuous monitoring of key/certificate stores in integrated applications and platforms. The present invention addresses this gap by offering an engine that uses a distributed agent model. The system integrates with application/web servers during infrastructure setup and continuously monitors all key/certificate stores, thus minimizing operational hazards. The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

The system may include components such as receiving a digital certificate request from a requesting entity; interfacing with a certificate manager service configured to store a database for tracking lifecycle of digital certificates; generating and disseminating a notification of a certificate event to designated recipients via real-time communication mechanisms; utilizing a specialized engine as an agent to capture and analyze events related to certificate requests and generate alerts via a specified communication medium; facilitating integration and communication between the specialized engine and enterprise infrastructure units, via a series of standardized remote procedure calls and secure file transfers; transmitting serialized data packets to an incident response management (IRM) system, noting security parameters and interpreting incoming data for potential anomalies; and sending a process requests to an end user interface, allowing for an end user to engage in certificate installations and configurations.

In one aspect, sending a process request to the end user interface, allowing for the end user to engage in certificate installations and configurations further comprises communicating feedback or alterations back to the specialized engine, closing a loop on automated certificate management flow.

In another aspect, the certificate event further comprises a certificate expiration. In yet another aspect, facilitating integration and communication between the specialized engine and the enterprise infrastructure units further comprises utilizing a hardware security module (HSM), application server, and web server, via the series of standardized remote procedure calls and secure file transfers. By employing the method and system disclosed herein, the specialized engine utilizes a containerized microservices architecture.

In further embodiments, the system is further configured to direct the digital certificate request to one of an internal certificate authority and an external certificate authority via secure communication channels.

In other embodiments, the system further comprises allowing the end user to engage with the specialized engine through an adaptable web interface.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "engine" may refer to a specialized software, hardware, or integrated software-hardware component responsible for performing specific tasks or functionalities within a broader system or application. Acting as the driving force or central mechanism, the engine processes input data, adheres to predefined algorithms or logic, and produces desired outcomes or results. It is designed to manage and coordinate principal operations, ensuring the efficient and correct functioning of associated modules or subsystems. Typically modular and scalable, an engine can interact with other components, systems, or databases, often serving as a bridge or interface. Its design might encompass various programming languages, frameworks, or hardware configurations, depending on its intended functionality and the nature of the system in which it operates. It is understood that, as used herein, "engine" provides a key descriptor, allowing for a wide range of implementations and embodiments without being restricted to a specific technical blueprint.

As used herein, "public key infrastructure" (PKI) is a comprehensive system that uses a pair of public and private cryptographic keys to enable secure communications and digital identity verification. It leverages digital certificates, issued by trusted Certificate Authorities (CAs), to authenticate the identity of the certificate holder and provide the public key for secure data exchange. PKIs ensure data confidentiality, integrity, and non-repudiation, making it foundational for security practices such as Secure Socket Layer/Transport Layer Security (SSL/TLS) web encryption, secure email transmission, code signing, and Virtual Private Network (VPN) access. With an underlying structure involving registration authorities and certificate revocation lists, PKI is vital in some instances for ensuring that digital certificates remain valid and uncompromised.

As used herein, "hardware security module" (HSM) is a specialized, tamper-resistant physical device designed to manage, generate, store, and protect cryptographic keys. An HSM safeguards and manages digital keys for strong authentication and provides cryptoprocessing capabilities, ensuring the security of sensitive data, whether in transit or at rest. These modules are equipped to handle cryptographic operations, including encryption, decryption, signing, and verification, often at high speeds. Designed to resist physical tampering, HSMs are fortified against unauthorized access, and in many instances, are programmed to zeroize (automatically erase) their contents if tampering is detected. They can exist as standalone devices, plug-in cards, or even cloud services, depending on the security needs of the implementation. The embedded software within an HSM, often firmware, is developed using secure coding practices and is built to be resilient against both physical and logical attacks.

As used herein, "Certificate Authority" (CA) may refer to a trusted entity responsible for issuing, managing, revoking, and renewing digital certificates within a digital communication infrastructure. These certificates attest to the identity of individuals or entities, facilitating secure data exchange by vouching for the authenticity of public keys. A CA functions as a guarantor in digital transactions, ensuring that the entity receiving a public key can trust its source. From a technical standpoint, a CA typically utilizes sophisticated software to manage the lifecycle of digital certificates, often operating on secure servers dedicated to the task. The CA's infrastructure is developed using secure coding practices to safeguard against potential vulnerabilities and attacks. Within the context of a patent or broader digital communication, two types of CAs are commonly referenced: an internal certificate authority and an external certificate authority. An internal certificate authority operates within the confines of a single organization, catering exclusively to its internal needs and often situated behind a protective firewall. In contrast, an external certificate authority offers services to external entities or the public at large, handling certificates for various clients, websites, and services, and might be subject to broader regulatory and compliance requirements. Both types emphasize the primary function of ensuring cryptographic trust within the ecosystem they serve.

As used herein, "integrated channel" may refer to a dedicated communication pathway, both digital or physical, designed to ensure seamless and streamlined interaction between different systems, devices, or software components. This channel often prioritizes the efficient and uninterrupted flow of data, leveraging standardized protocols or interfaces to facilitate compatibility and interoperability. From a hardware perspective, an integrated channel could manifest as dedicated bus systems, direct memory access pathways, or specific wired or wireless connections optimized for certain data transmission rates. On the software side, integrated channels often utilize APIs (Application Programming Interfaces), middleware, or other software tools to establish and maintain a connection, ensuring that data packets or messages are appropriately formatted, transmitted, received, and decoded. In some embodiments, integrated channels might incorporate encryption or other security measures, especially when transmitting sensitive or confidential information. The primary goal of an integrated channel, in the broad context of digital communication and interactivity, is to create a consistent and reliable communication link, mitigating potential disruptions or inefficiencies and fostering cohesiveness in integrated systems or platforms.

As used herein, "notification" may refer to a message or alert generated by a system, application, or device to inform or alert an end-user, another system, or a specific process about a particular event, status, or update. Notifications can be delivered in a multitude of formats, including visual cues (such as pop-up messages, badges, or icons), auditory signals (like beeps or spoken messages), or even tactile feedback (vibrations or haptic responses). From a software perspective, notifications are typically coded using specific libraries or APIs (Application Programming Interfaces) tailored to the platform or operating system in question. These APIs ensure the appropriate delivery and presentation of the notification to its intended recipient. In some embodiments, notifications might incorporate priority levels, categorizations, or other metadata to help recipients discern the urgency or context of the alert. Furthermore, notifications can be enriched with actionable options, allowing users to respond directly from the notification interface. For systems or applications that operate across distributed networks or platforms, notifications may also be transmitted via standardized communication protocols, ensuring timely and accurate delivery. In the context of digital communication and user experience, the primary aim of a notification is to convey crucial information promptly, ensuring timely awareness or response to specific events or situations.

As used herein, "end user" may refer to the individual, group, or entity that directly utilizes a product, application, system, or service. Unlike developers, administrators, or intermediaries who might be involved in the creation, maintenance, or distribution of a technology, the end user interacts with the technology for its intended primary purpose. From a software perspective, applications are typically designed with the end user's experience, needs, and objectives in mind, prioritizing features, functionalities, and interfaces that cater to their specific use cases. In many instances, end users might not have deep technical knowledge about the underlying mechanisms or architectures of the products they use; hence, emphasis is often placed on creating intuitive and user-friendly designs. The feedback and preferences of end users are pivotal in shaping the direction of product enhancements and iterations. In broader contexts, the term "end user" can be applied across various industries, referring to the final consumer or beneficiary of a particular product, service, or information, distinguishing them from those involved in the upstream processes or stages of its lifecycle.

As used herein, a "server" may refer to both a physical hardware system and the software that runs on it, dedicated to managing network resources and providing services to other computers and devices. A server typically consists of a high-capacity central processing unit (CPU), significant amounts of RAM, and large storage capabilities, optimized for tasks such as data storage, retrieval, and processing. From a software perspective, server software is specialized to receive requests and, when possible, comply with these requests, which come from other software clients. Specifically, a hardware security module (HSM) is a physical computing device that safeguards and manages digital keys for strong authentication and, in the server context, would be dedicated to cryptographic operations, ensuring secure cryptographic key generation, management, and storage. An application server, on the other hand, houses applications and their associated components, serving as the platform where application logic is executed, often interacting with database servers to retrieve and store data on behalf of client devices or users. A web server's primary function is to store, process, and deliver web pages to users, handling requests from web browsers and delivering website content via protocols such as HTTP or HTTPS. It is understood that, in many modern infrastructures, the lines separating these servers can overlap, especially with the rise of microservices or containerized applications, but their core functions remain integral to designing and deploying scalable and secure network architectures.

As used herein, a "cryptoscope engine" may refer to both a specialized hardware component and the accompanying software tailored for monitoring, analyzing, and managing digital certificate-related events within a networked environment. From a hardware standpoint, the cryptoscope engine is constructed to handle vast quantities of data in real-time, equipped with accelerated processing capabilities, ample memory, and efficient storage mechanisms to promptly capture and process certificate-related activities. Software-wise, the cryptoscope engine operates on algorithms and logic that can swiftly detect anomalies, potential threats, or irregularities in the digital certificate lifecycle, acting as an intermediary that connects various system components, like certificate authorities, servers, and end-users. This engine may embrace modern software architectural paradigms like microservices, allowing for modular, scalable, and resilient operations. Furthermore, the cryptoscope engine's software layer is often containerized, facilitating seamless integration, scalability, and deployment across diverse environments. Its core functionality revolves around safeguarding the integrity and security of digital certificates, bridging gaps between various system entities, and ensuring that certificate-related communications and transactions are seamless, secure, and efficient. In some implementations, the cryptoscope engine might also be embedded with notification and alert systems, ensuring that any crucial events or potential issues are immediately flagged for appropriate action. The utility and versatility of the cryptoscope engine make it a cornerstone in a robust and secure digital certificate management ecosystem.

As used herein, "configurations" in the context of certificate authentication may refer to the set of parameters, settings, and directives that dictate how a digital certificate will be utilized within a system or network environment. This encompasses the rules for certificate issuance, renewal, revocation, and storage. It also includes the criteria by which certificates are verified, the trust hierarchies established (which root and intermediate certificates are trusted), the cryptographic algorithms supported, the key lengths allowed, and the protocols by which certificates are exchanged between parties. Additionally, "configurations" may determine how often certificate validations occur, how certificate revocation lists (CRLs) or Online Certificate Status Protocol (OCSP) responses are fetched and interpreted, and how exceptions or anomalies are handled. In essence, configurations lay out the blueprint for how certificate authentication operates within a specific system, ensuring secure and trusted communications.

As used herein, "certificate installation" in the context of digital security refers to the process of embedding or placing a digital certificate within a specific software or hardware environment to facilitate secure communications or authenticate an identity. This process often involves selecting the appropriate certificate, ensuring its validity, and then importing it into a system, application, or device. Once installed, the certificate can establish a trust chain, confirming the legitimacy of a server or client in network transactions. The installation also typically requires the correct placement of both public and private keys associated with the certificate, though in many environments, the private key remains securely stored and inaccessible. Configurations may need to be adjusted to ensure the system or application correctly references and utilizes the installed certificate for operations like SSL/TLS handshakes, email encryption, or code signing. Successful certificate installation ensures that encrypted connections can be established, identities can be verified, and the integrity of data can be maintained.

As used herein, a "microservices architecture" in the context of certificate authentication refers to a method of developing and structuring an authentication system where individual components or functionalities are decoupled and operate as independent services. Each of these services, or "microservices," is designed to perform a specific function or handle a particular aspect of certificate authentication, and they can be developed, deployed, and scaled independently of one another. In such an architecture, instead of having a monolithic authentication system where all functionalities are tightly integrated and run as a single unit, the system is broken down into smaller, manageable pieces. For instance, one microservice might handle certificate issuance, another might manage certificate revocation, a third might deal with certificate renewal, and so forth. These microservices communicate with each other typically over lightweight protocols such as HTTP/REST or message queues. The decoupled nature of microservices allows for flexibility, scalability, and resilience. For example, if there's a spike in certificate renewal requests, the renewal microservice can be scaled up independently without affecting other parts of the system. In the realm of certificate authentication, adopting a microservices architecture can offer several benefits. It allows for rapid updates or changes to specific certificate processes without disturbing the entire system. It also facilitates easier problem diagnosis, as issues can be isolated to specific microservices rather than sifting through a large monolithic application. Furthermore, microservices can be developed using the best-suited technology or programming language for the task, rather than being restricted to a single technology stack for the entire system.

As used herein, "secure communication channels" in the context of certificate authentication refer to pathways or methods of transferring data between entities, such as between client devices and servers or between different services, that have been enhanced with security measures to ensure the confidentiality, integrity, and authenticity of the data being transmitted. These channels are established using protocols, mechanisms, and cryptographic methods designed to protect against eavesdropping, interception, tampering, or unauthorized access. Typically, such channels utilize encryption techniques where data is converted into a cipher or code to conceal its true content. Only entities with the appropriate decryption key or mechanism can revert the ciphered data back to its original, comprehensible form. In the realm of certificate authentication, secure communication channels are crucial. For instance, when a client device requests a digital certificate from a certificate authority (CA), the data exchanged—such as the certificate signing request, private keys, or the digital certificate itself—needs to be protected against potentially harmful actors. As such, protocols like SSL/TLS (Secure Sockets Layer/Transport Layer Security) are commonly employed. These protocols not only encrypt the data but also ensure its integrity (preventing data tampering during transmission) and provide authentication (ensuring the legitimacy of the entities involved in the communication). Moreover, secure communication channels might also incorporate other security features, such as mutual authentication (where both parties verify each other's identities), session key generation (where a unique encryption key is generated for each session), and perfect forward secrecy (ensuring that even if a session key is compromised, past session keys remain secure).

As used herein, an "adaptable web interface" may refer to a user-facing digital portal or dashboard tailored for the certificate authentication process, designed to be flexible and responsive. Such an interface can dynamically adjust its content, layout, and functionalities based on varying parameters, such as the type of device accessing it (e.g., mobile, tablet, desktop), user preferences, or the specific certificate-related task at hand. Within the context of this invention, this adaptability ensures that the end users, regardless of their technical proficiency or the device they are using, can efficiently manage, monitor, and interact with the cryptographic key stores and associated processes. The adaptable nature of this interface is crucial in ensuring the real-time monitoring, notifications, and management of digital certificates, facilitating a seamless and efficient user experience in the realm of certificate authentication.

As used herein, "enterprise infrastructure units" refer to the integral hardware and software components of an organizational network, specifically designed to support and optimize the certificate authentication process and lifecycle management. Within the context of the present invention, these units encompass a variety of interconnected systems, including but not limited to Hardware Security Modules (HSMs) for cryptographic operations, application servers that execute application logic and facilitate interactions with databases, and web servers responsible for processing and delivering web-based content related to certificate management. These units collectively work in synergy, enabling a cohesive and efficient environment for managing, renewing, and monitoring cryptographic key stores throughout the enterprise.

As used herein, "process request" refers to a formalized digital inquiry or command, originating from one component of the cryptographic key management system, directed towards another component or end user within the enterprise infrastructure. In the context of the present invention, a process request is designed to initiate, continue, or complete a specific task related to certificate authentication, lifecycle management, or incident response. Such requests can encompass a range of actions, from the initial acquisition or renewal of a digital certificate from an authority, to configurations, all aimed at ensuring the integrity, validity, and secure deployment of cryptographic keys within the organization.

As used herein, communicating "feedback or alterations back to the specialized engine" refers to the bi-directional exchange of information between different components of the system and the specialized engine, in this case, the cryptoscope engine. In the context of the present invention, once an operation or process is initiated or completed, relevant data, observations, outcomes, or modifications are conveyed back to the engine. This mechanism ensures that the engine remains updated and can adapt or optimize its future operations based on the feedback received. The feedback might include details like successful certificate installations, errors or exceptions encountered, recommendations for optimization, or specific changes made during an operation. This continuous loop of communication allows the cryptoscope engine to evolve, adapt, and maintain the highest standards of cryptographic key management and security across the enterprise infrastructure.

Enterprises and third-party applications rely on secure communication channels for interacting with end users and consumer platforms. To maintain data integrity and authenticity, these endpoint application platforms utilize digital certificates and Public Key Infrastructure (PKI) for secure communication. These digital certificates and their corresponding keys have defined expiration dates, necessitating periodic renewals. Presently, monitoring and renewal of these digital certificates largely involve manual processes, leaving them susceptible to human errors. Such oversights can result in application outages or, more critically, potential system vulnerabilities that malicious actors might utilize. Moreover, unmonitored stale or unused key pairs in trust stores and keystores pose additional security problems or issues.

In response to these challenges, large enterprises have adopted PKI solutions tailored to their cryptographic (involving Private-Public key certificates) requirements. While these solutions handle key and digital certificate lifecycle management, covering creation, revocation, renewal, and discovery, they often lack continuous monitoring of key/certificate stores and seamless integration with applications/platforms. The present invention provides a solution designed to bridge these gaps. The present invention offers an engine featuring a distributed agent model operating on a subscription basis. For instances, when integrating with application or web servers during infrastructure commissioning within an enterprise environment, the present invention actively and continuously monitors all key/certificate stores, significantly mitigating operational harms.

In part, what sets the present invention apart from conventional solutions is its emphasis on centralized service for key/certificate store monitoring and management, ensuring secure communication for enterprise applications. It not only reduces the chances of manual errors but also bolsters security by regularly recycling expiring or unused keys/certificates. This system supports automated discovery and monitoring of key/certificate stores, alerting application owners, support teams, and security operations centers (SOCs) of any changes. With its centralized monitoring of all associated agents, application support teams and owners have an enhanced overview. Moreover, the minimal footprint of its agents guarantees no adverse impact on infrastructure health. Accordingly, the present disclosure addresses the critical need for secure communication channels in enterprises and third-party applications, focusing on the challenges posed by the manual management of digital certificates and Public Key Infrastructure (PKI). By introducing a centralized system with continuous monitoring and seamless integration capabilities, the invention aims to mitigate the vulnerabilities associated with expired or unused keys, reduce human errors, and enhance overall security. Furthermore, the invention's distributed agent model promotes efficient certificate lifecycle management, providing stakeholders with real-time alerts and insights without compromising infrastructure health.

What is more, the present disclosure provides a technical solution to a technical problem. As described herein, the technical problem includes the manual monitoring and renewal of digital certificates and PKI, which can lead to human errors, application outages, and potential system vulnerabilities due to expired or unused keys. The technical solution presented herein allows for centralized and continuous monitoring of key/certificate stores, automated discovery, and alert mechanisms. In particular, this approach to PKI management is an improvement over existing solutions to the challenges of digital certificate lifecycle management, (i) with fewer steps to achieve the solution, thus reducing the amount of computing resources, such as processing resources, storage resources, network resources, and/or the like, that are being used, (ii) providing a more accurate solution to the problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
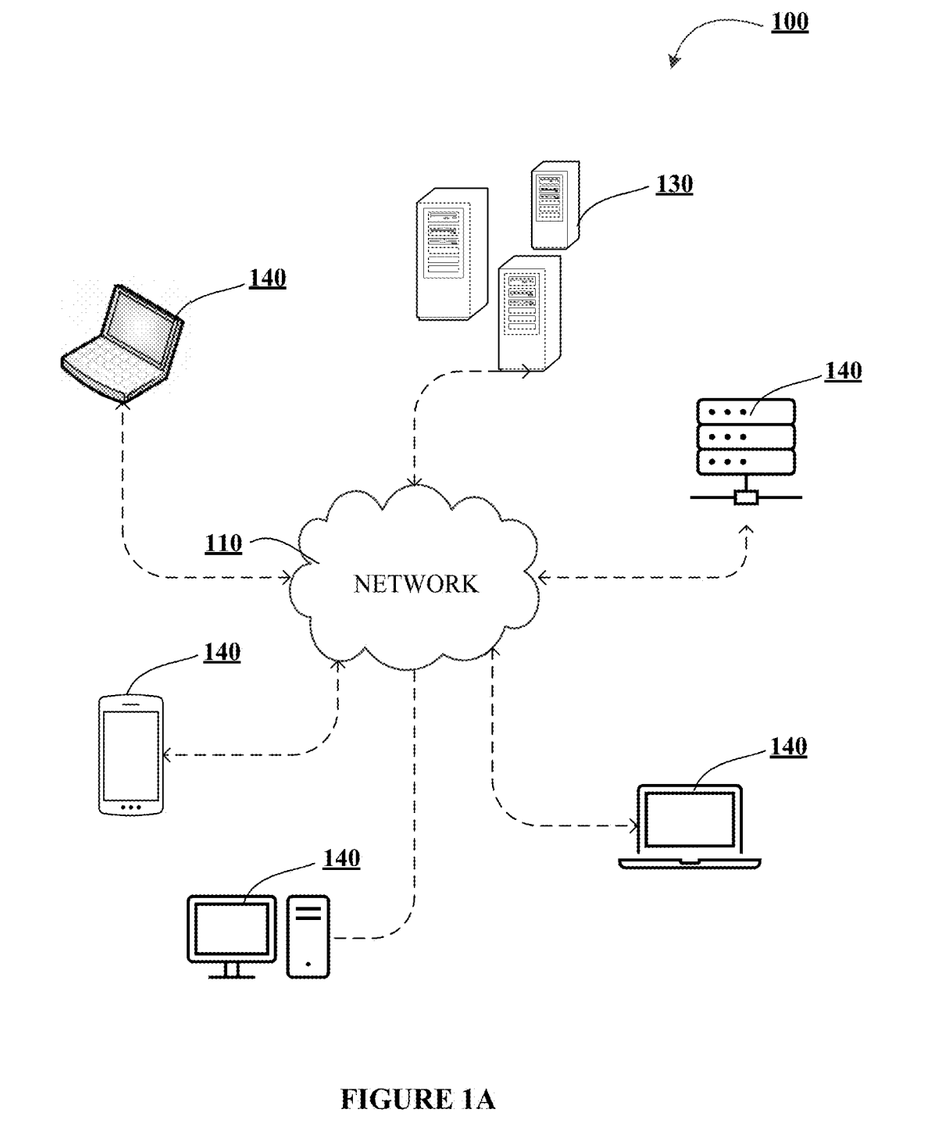
FIGS. 1A-1C illustrates technical components of an exemplary distributed computing environment for agent-based monitoring of cryptographic key stores, in accordance with an embodiment of the disclosure.
Figure 1B:
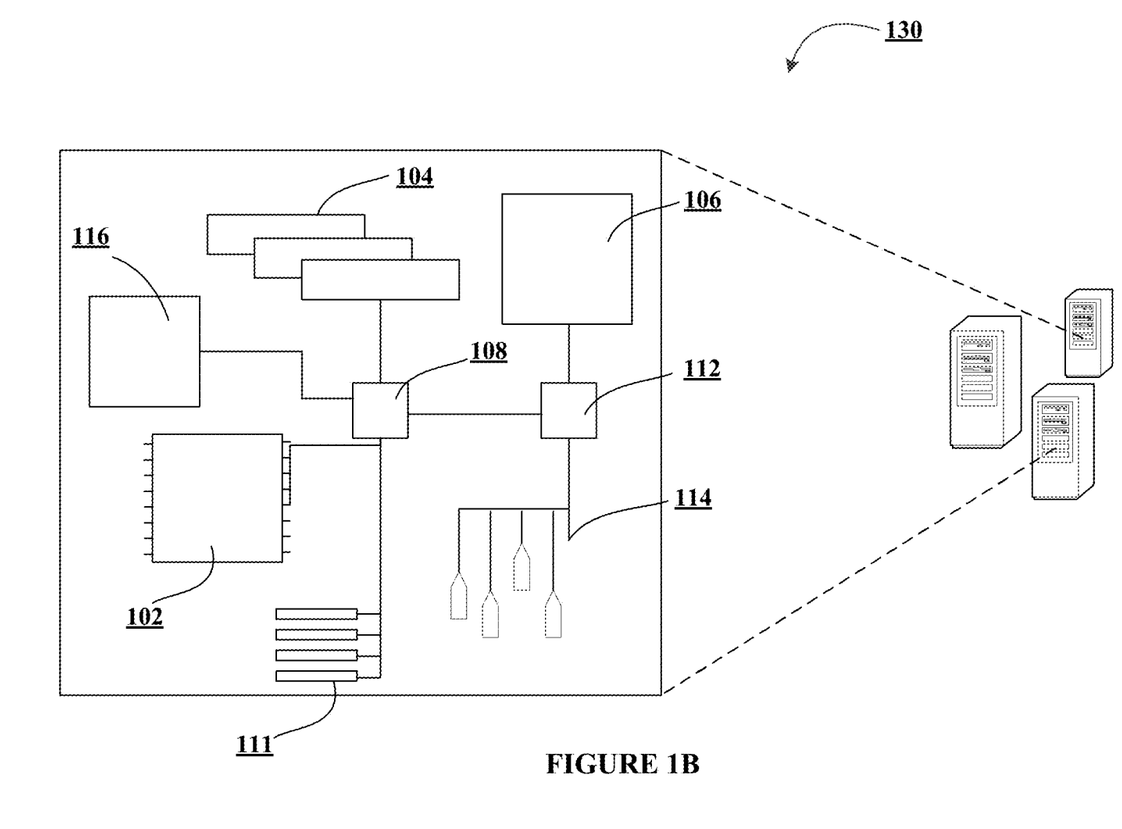
Figure 1C:
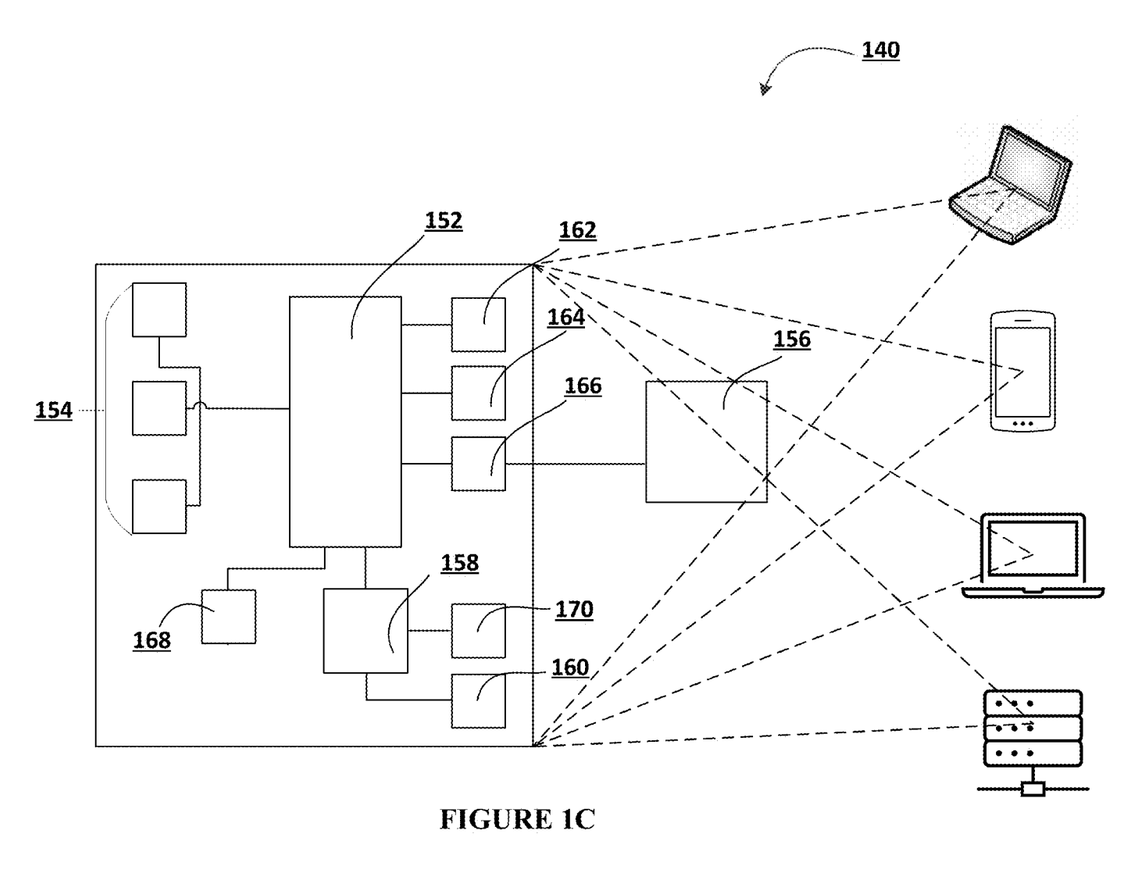

FIGS. 1A-1C illustrate technical components of an exemplary distributed computing environment 100 for agent-based monitoring of cryptographic key stores, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

The present invention presents a transformative approach to certificate management. In conventional systems, the process is fragmented and predominantly manual: an enterprise application team requests certificates, waits for the PKI team to issue them, and then handles installation and tracking independently. This disjointed flow inherently contains more opportunities for error, oversights in certificate expiration, and subsequent renewals. Such oversights can inadvertently expose systems to potential vulnerabilities.

Figure 2:
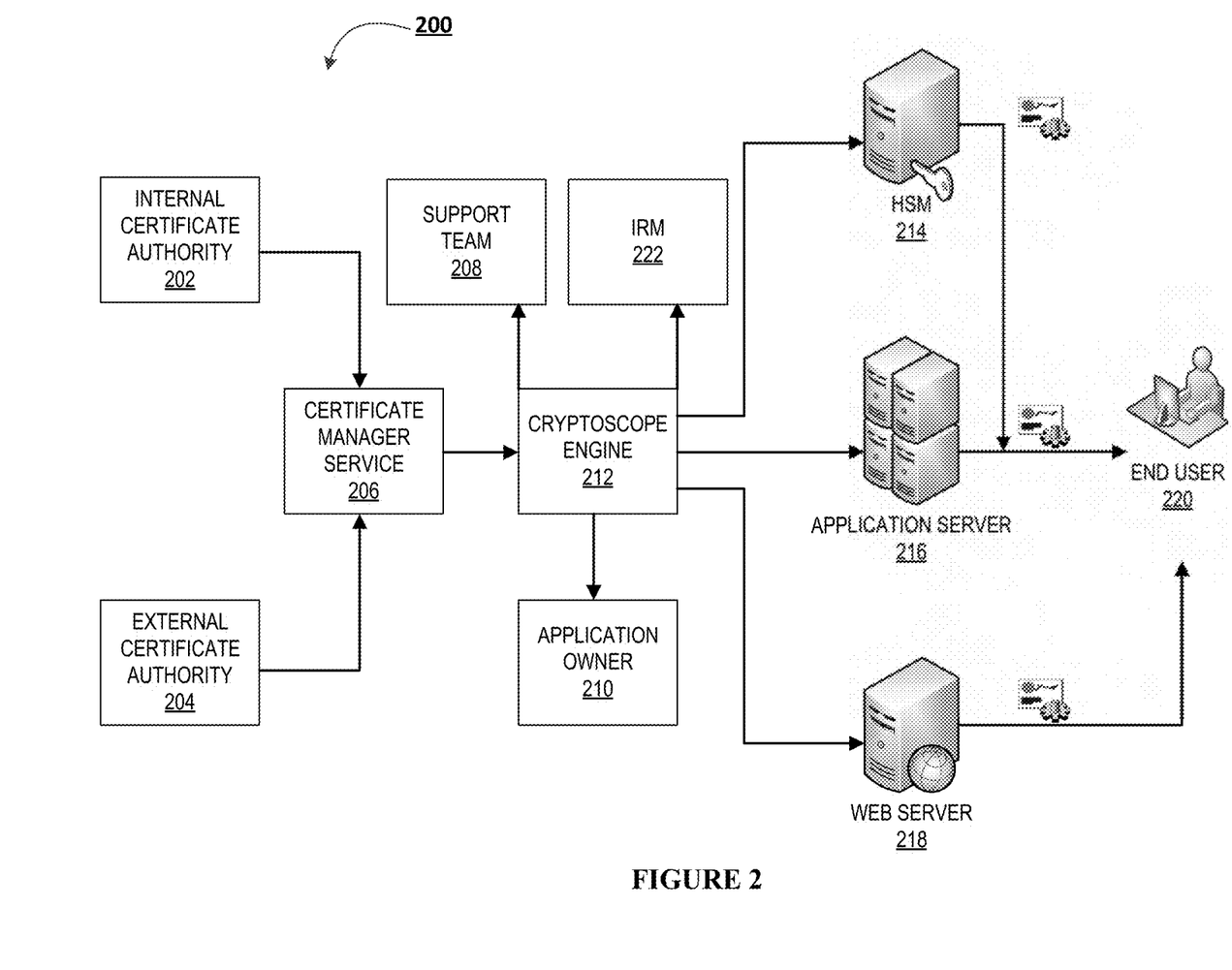
FIG. 2 illustrates a process flow diagram 200 for agent-based monitoring of cryptographic key stores, in accordance with an embodiment of the present invention.

In contrast, the present invention introduces an automation-centric paradigm. At the onset, as the server infrastructure is requested, a cryptoscope engine 212 is embedded, streamlining certificate management from the beginning of the server's lifecycle. Not only does it proactively scan and register key/certificate stores, but the cryptoscope engine 212 also serves as a centralized hub, offering intuitive management options through a user-friendly user-interface (UI). The innovation further underscores proactive security, initiating automated renewals and issuing alerts well in advance of expiration dates, safeguarding against unauthorized manual installations, and bolstering overall system integrity by flagging weak trust store passwords and unapproved certificates. Moreover, with a keen emphasis on transparency and oversight, the engine disseminates monthly reports to pertinent stakeholders, fostering informed certificate management decisions. In essence, the invention's holistic, integrated, and automation-driven approach not only makes certificate management more efficient but also greatly enhances the security posture of an enterprise environment.

FIG. 2 illustrates a process flow diagram 200, in accordance with an embodiment of the present invention. As shown in FIG. 2, at the outset of the process, a digital certificate request is sent to either an internal certificate authority 202 or an external certificate authority 204 (the certificate authorities) using secure communication channels. In some embodiments, these channels leverage protocols such as LDAP over SSL/TLS (Secure Sockets Layer/Transport Layer Security) for internal connections and OCSP (Online Certificate Status Protocol) or SCEP (Simple Certificate Enrollment Protocol) for interfacing with external entities. In some embodiments, the certificate authorities may be constructed using platforms like OpenSSL or other infrastructure, in order to interpret and process the request. In some embodiments, a certificate manager service 206 integrates with certificate libraries and maintains a database, using platforms such as PostgreSQL or MySQL, to track the lifecycle of digital certificates. In some embodiments, the system utilizes Python's PyOpenSSL or Java's JCA/JCE (Java Cryptography Architecture/Java Cryptography Extension) libraries to automate certificate lifecycle management functions. In some embodiments, when an event, such as certificate expiration, nears, the service triggers a notification through the MQTT (Message Queuing Telemetry Transport) protocol or WebSocket for real-time alerts.

In some embodiments, the cryptoscope engine 212 embraces a microservices architecture and is containerized to capture certain events related to certificate requests. In some embodiments, the system uses Java's JavaMail for email alerts or integrates with third-party services like Twilio for SMS. RESTful APIs (Application Programming Interfaces), developed in languages like Node.js or Go, ensure swift communication between services.

Central to the system is the integration between cryptoscope engine 212 and enterprise infrastructure units: HSM (Hardware Security Module) 214, application server 216, and web server 218. This is facilitated by RPC (Remote Procedure Call) calls, which, in some embodiments, utilize gRPC due to its efficient protocol buffers, and secure file transfers, such as SCP (Secure Copy Protocol) or SFTP (Secure File Transfer Protocol). For HSM 214, hardware-level communication might adopt the PKCS #11 (Public-Key Cryptography Standards #11) standard to interact with cryptographic tokens. The inclusion of incident response management (IRM) 222 reinforces the system's security. In some embodiments, the IRM is developed using performance-oriented languages like C++ or Rust, employing machine learning frameworks like TensorFlow or PyTorch. Cryptoscope engine 212 sends serialized data packets to the IRM 222. On the frontend, in some embodiments, users can engage through web interfaces crafted with React or Vue.js, which communicate with backend services via GraphQL or REST APIs, ensuring real-time data interactions.

The process illustrated in FIG. 2 culminates with an end user 220. The end user 220, often a human operator or, in some embodiments, an automated application, receives process requests from the HSM 214, application server 216, and web server 218. These requests may involve certificate installations, configurations, or other tasks. The interaction with the end user 220 is critical, as it serves as the final verification or manual touchpoint in the automated certificate management flow. In some embodiments, the end user 220's interface is designed with responsive web technologies providing a seamless experience across devices. Communication with the end user 220 could be facilitated via API calls, WebSocket connections, or direct database interactions, ensuring timely and accurate relay of information. Through this comprehensive integration, the system achieves a balance of automation and human oversight, guaranteeing both efficiency and meticulous attention to security details.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for agent-based monitoring of cryptographic key stores, the system comprising:
a processing device;
a non-transitory storage device containing instructions when executed by the processing device, causes the processing device to perform the steps of:
receiving a digital certificate request from a requesting entity;
interfacing with a certificate manager service configured to store a database for tracking lifecycle of digital certificates;
generating and disseminating a notification of a certificate event to designated recipients via real-time communication mechanisms;
utilizing a specialized engine as an agent to capture and analyze events related to certificate requests and generate alerts via a specified communication medium;
integrating the specialized engine and enterprise infrastructure units via a series of remote procedure calls and secure file transfers, wherein integrating the specialized engine and the enterprise infrastructure units further comprises utilizing a hardware security module (HSM), application server, and web server, via the series of remote procedure calls and secure file transfers;
transmitting serialized data packets to an incident response management (IRM) system noting security parameters and interpreting incoming data for potential anomalies; and
sending a process request to an end user interface, allowing for an end user to engage in certificate installations and configurations.

2. The system of claim 1, wherein sending a process request to the end user interface, allowing for the end user to engage in certificate installations and configurations further comprises communicating feedback or alterations back to the specialized engine, closing a loop on automated certificate management flow.

3. The system of claim 1, wherein the certificate event further comprises a certificate expiration.

4. The system of claim 1, wherein the specialized engine utilizes a containerized microservices architecture.

5. The system of claim 1, wherein the specialized engine is further configured to direct the digital certificate request to one of an internal certificate authority and an external certificate authority via secure communication channels.

6. The system of claim 1, further comprising allowing the end user to engage with the specialized engine through an adaptable web interface.

7. A computer program product for agent-based monitoring of cryptographic key stores, the computer program product comprising a non-transitory computer-readable medium comprising code causing an apparatus to:
receive a digital certificate request from a requesting entity;
interface with a certificate manager service configured to store a database for tracking lifecycle of digital certificates;
generate and disseminate a notification of a certificate event to designated recipients via real-time communication mechanisms;
utilize a specialized engine as an agent to capture and analyze events related to certificate requests and generate alerts via a specified communication medium;
facilitate integration and communication between the specialized engine and enterprise infrastructure units via a series of remote procedure calls and secure file transfers, wherein integrating the specialized engine and the enterprise infrastructure units further comprises utilizing a hardware security module (HSM), application server, and web server, via the series of remote procedure calls and secure file transfers;

transmit serialized data packets to an incident response management (IRM) system noting security parameters and interpreting incoming data for potential anomalies; and send a process request to an end user interface, allowing for an end user to engage in certificate installations and configurations.

8. The computer program product of claim 7, wherein sending a process request to the end user interface, allowing for the end user to engage in certificate installations and configurations further comprises communicating feedback or alterations back to the specialized engine, closing a loop on automated certificate management flow.

9. The computer program product of claim 7, wherein the certificate event further comprises a certificate expiration.

10. The computer program product of claim 7, wherein the specialized engine utilizes a containerized microservices architecture.

11. The computer program product of claim 7, wherein the specialized engine is further configured to direct the digital certificate request to one of an internal certificate authority and an external certificate authority via secure communication channels.

12. The computer program product of claim 7, further comprising allowing the end user to engage with the specialized engine through an adaptable web interface.

13. A method for agent-based monitoring of cryptographic key stores, the method comprising:

receiving a digital certificate request from a requesting entity;

interfacing with a certificate manager service configured to store a database for tracking lifecycle of digital certificates;

generating and disseminating a notification of a certificate event to designated recipients via real-time communication mechanisms;

utilizing a specialized engine as an agent to capture and analyze events related to certificate requests and generate alerts via a specified communication medium;

integrating the specialized engine and enterprise infrastructure units via a series of remote procedure calls and secure file transfers, wherein integrating the specialized engine and the enterprise infrastructure units further comprises utilizing a hardware security module (HSM), application server, and web server, via the series of remote procedure calls and secure file transfers;

transmitting serialized data packets to an incident response management (IRM) system noting security parameters and interpreting incoming data for potential anomalies; and sending a process request to an end user interface, allowing for an end user to engage in certificate installations and configurations.

14. The method of claim 13, wherein the method further comprises:

sending a process request to the end user interface, allowing for the end user to engage in certificate installations and configurations further comprises communicating feedback or alterations back to the specialized engine, closing a loop on automated certificate management flow.

15. The method of claim 13, wherein the certificate event further comprises a certificate expiration.

16. The method of claim 13, wherein the specialized engine utilizes a containerized microservices architecture.

17. The method of claim 13, wherein the specialized engine is further configured to direct the digital certificate request to one of an internal certificate authority and an external certificate authority via secure communication channels.

* * * * *